United States Patent
Ban et al.

(10) Patent No.: US 6,350,536 B1
(45) Date of Patent: Feb. 26, 2002

(54) METHOD FOR PREVENTING COMPRESSOR FROM FREEZING IN AUTOMOBILE FUEL CELL SYSTEM

(75) Inventors: Takashi Ban; Toshiro Fujii; Hirohisa Katoh; Ryuta Kawaguchi, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/413,834

(22) Filed: Oct. 6, 1999

(30) Foreign Application Priority Data

Oct. 7, 1998 (JP) .......................................... 10-285349

(51) Int. Cl.$^7$ ................................................ H01M 8/00
(52) U.S. Cl. .............................. 429/13; 429/22; 429/24
(58) Field of Search ............................... 429/13, 22, 24

(56) References Cited

U.S. PATENT DOCUMENTS

| | | | |
|---|---|---|---|
| 5,154,986 A | * 10/1992 | Takechi et al. | 429/23 |
| 5,432,020 A | 7/1995 | Fleck | 429/13 |
| 5,434,016 A | 7/1995 | Benz et al. | 429/13 |
| 5,645,950 A | 7/1997 | Benz et al. | 429/13 |

FOREIGN PATENT DOCUMENTS

| | | |
|---|---|---|
| JP | 51-145005 | 12/1976 |
| JP | 58-129086 | 9/1983 |
| JP | 58-129087 | 9/1983 |
| JP | 7-14599 | 1/1995 |

* cited by examiner

*Primary Examiner*—Stephen Kalafut
*Assistant Examiner*—Julian A. Mercado
(74) *Attorney, Agent, or Firm*—Morgan & Finnegan, LLP

(57) ABSTRACT

A fuel cell system including a fuel cell having an air feeding tube, an air discharging tube and a fuel feeding tube, the air discharged from the fuel cell through the air discharging tube containing water. The system also includes a compressor, a water separation tank, and a water supply passage for supplying water collected in the water separation tank to the compressor. When the system is to be stopped, the water supply passage is first blocked while the compressor is operating. The humidity or the temperature of the process air is then detected, and the compressor is stopped when the detected humidity is lower than a predetermined value, or when the detected temperature is higher than a predetermined value.

2 Claims, 2 Drawing Sheets

METHOD FOR PREVENTING COMPRESSOR FROM FREEZING IN AUTOMOBILE FUEL CELL SYSTEM

BACKGROUND OF THE INVENTION

1. Field of the Invention

The present invention relates to a method for preventing a compressor from freezing in an automobile fuel cell system in which water contained in a gas discharged from a fuel cell is used for humidifying process air.

2. Description of the Related Art

A fuel cell system in which water is supplied to humidify the process gas is known and disclosed, for example, in Japanese Unexamined Patent Publication (Kokai) No. 7-14599. Such a fuel cell system is shown in FIG. 2 in the attached drawings in which air is sucked from an air feeding conduit 30 and supplied to a fuel cell 33 after it has been pressurized to a certain pressure by a compressor 32 driven by a motor 31. Oxygen in the air is consumed in the fuel cell 33 and the gas is released to ambient air as discharge gas after being expanded by an expansion device 35 coupled to the compressor 32 and the motor 31 by a common shaft 34.

On the other hand, water produced and contained in the discharge gas is collected into an open type reservoir 39 after being separated from the discharge gas by liquid separators 37 and 38 provided in an air discharge conduit 36, and is delivered to a jet nozzle 41 by a pump 40 to be injected into the air feeding conduit 30 for humidifying the process air.

That is, in the above-mentioned fuel cell system, the produced water contained in the discharge gas from the fuel cell 33 is separated and collected, and used for humidifying the process air.

When the compressor 32 is operated to enable the fuel cell 33 to supply electric power, the collected water circulates while being maintained at a somewhat higher temperature due to the heat of reaction. If the fuel cell system is stopped, all the water circulating through the fuel cell 33 is not collected but is liable to remain especially in the interior of the compressor 32 or the water feeding path.

Accordingly, when the fuel cell system is used in a cold district, the remaining water in such a state may freeze to block the water path or break the compressor 32 when the system is restarted. Of course, to avoid such a trouble, a countermeasure may be considered in that the operation of the compressor 32 continues for a predetermined period of time after the supply of water has interrupted so that the remaining water is discharged as much as possible. In the fuel cell system for an automobile, however, such a period of time necessary for stopping the compressor becomes considerably long because it must includes a large margin to cover the variation of rotational speed of the compressor due to the change of an engine output and/or a stored amount of electric power in a secondary battery, resulting in the increase in energy loss.

SUMMARY OF THE INVENTION

The object of the present invention is to solve the above described problems and to provide a method for assuredly preventing the compressor from freezing, in a simple manner, in the fuel cell system.

To solve the above-mentioned problem, a method for preventing a compressor from freezing in an automobile fuel cell system is provided, which system comprises a fuel cell having an air feeding tube and an air discharging tube, the compressor connected to the air feeding tube, a regenerator connected to the air discharging tube, a water separation tank disposed in the air discharging tube before the regenerator, and a water supply passage to supply water collected in the water separation tank to the compressor. According to the first aspect of the present invention, the method comprises the steps of: issuing a command to block the water supply passage when the output of the fuel cell is to be stopped while the compressor is operating; detecting humidity in a process air discharged from the compressor after the water-feeding path is blocked; and issuing a command to stop the compressor when the detected humidity decreases to a preset value.

Water supplied to the compressor is evaporated by the compressed and heated air, and as a result the process air is humidified by the vapor thus obtained. If the water supply path is blocked prior to the stop of the compressor, the humidity in the process air discharged from the compressor promptly decreases, whereby the detected humidity soon lowers to a preset value and the command for stopping the compressor issues at this time. Since the detection of such a low humidity (the preset value) means that the moisture in the interior of the compressor including the water-feeding path has been discharged as much as possible, it is possible to assuredly prevent any accident from occurring due to the freezing of the remaining water, without useless energy loss.

According to the second aspect of the present invention, the presence of the remaining moisture in the compressor is detected by the detection of the temperature of the process air. If the water supply is interrupted, the humidity to be added to the process air also decreases, which simultaneously lowers the capacity for cooling the process air. Thus, it is similarly possible to prevent any accident from occurring due to the freezing of the remaining water, by using the preset temperature value.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
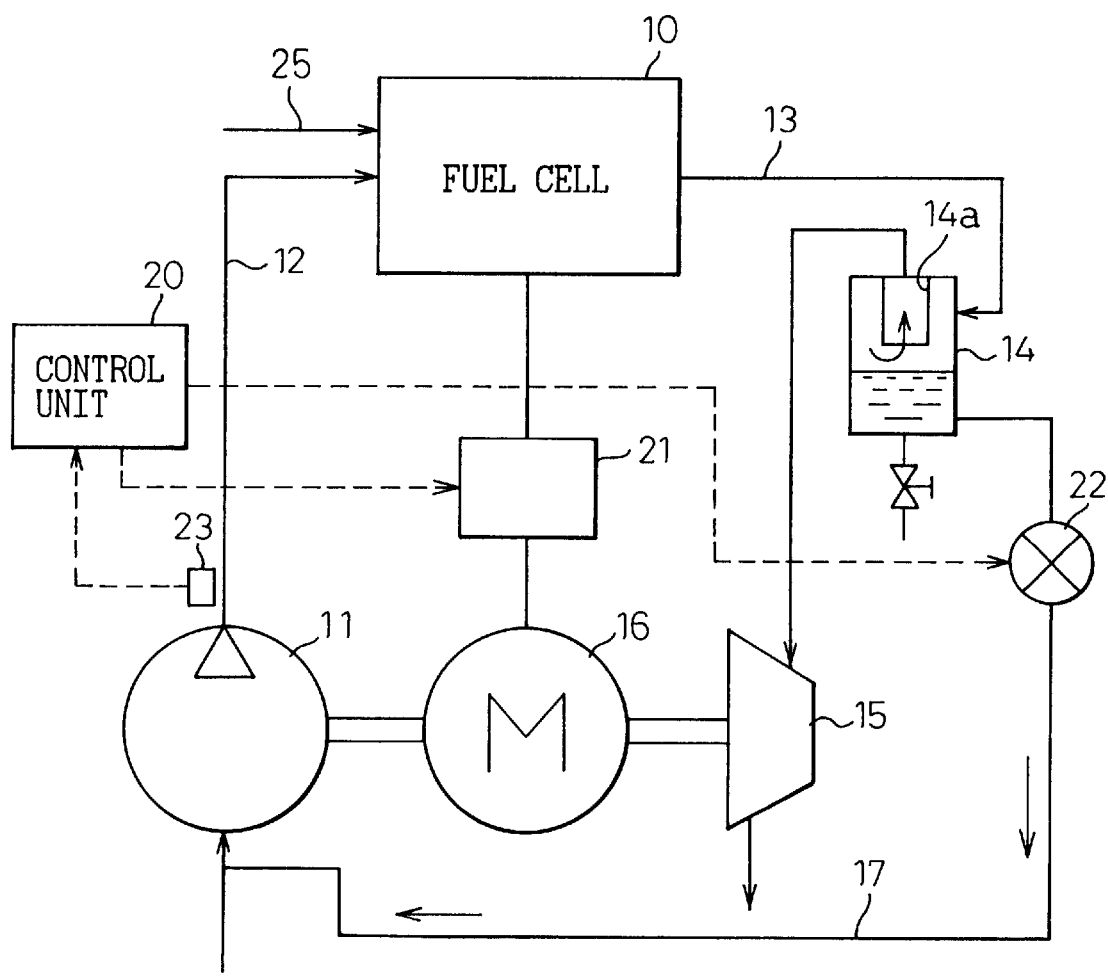
FIG. 1 is a schematic view illustrating the main parts of a fuel cell system according to the present invention.
Figure 2:
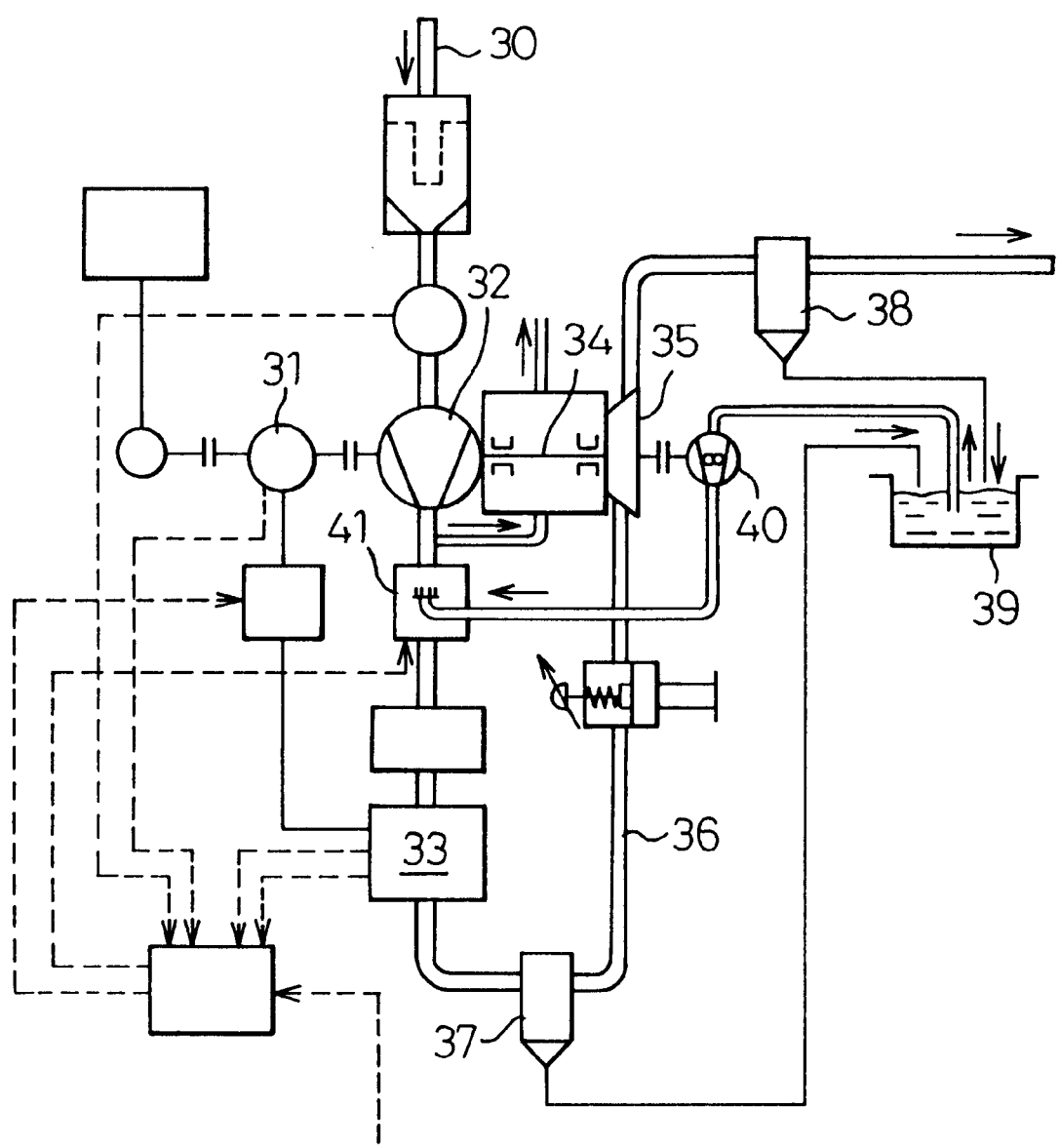
FIG. 2 is a schematic view illustrating a basic structure of a conventional fuel cell system.

The preferred embodiment of the present invention will now be described in detail with reference to FIG. 1 which schematically illustrates the main parts of a fuel cell system. The fuel cell system includes a fuel cell 10.

As is well known, a fuel cell 10 has an electrolyte in the form of a flat sheet and a cathode and an anode laminated on either side of the electrolyte. Process air supplied to the fuel cell 10 by an air feeding pipe 12 via a compressor 11 passes through an anode space (not shown) and is discharged from the fuel cell 10 to the outside through an air discharging pipe 13. In a cathode space (also not shown) of the fuel cell 10, gas containing a large amount of hydrogen or modified hydrogen is supplied via a fuel feeding path 25. When the hydrogen reacts with oxygen contained in the process gas within the fuel cell 10, electric energy is generated and water and the heat of reaction are-also generated, whereby discharge gas containing a large amount of water vapor is discharged via the air discharging pipe 13.

To remove the water contained in the discharge gas, a water separation tank 14 is provided in the air discharging pipe 13, the tank 14 having an outer cylindrical wall for defining a hermetically sealed space, a small cylindrical separator 14a depending from the top of the outer wall, and a lower half of the tank providing a space necessary for storing separated water. An inlet for the air discharging pipe 13 is connected to the upper portion of the outer cylindrical wall, and an exit thereof is connected to the top wall of the separator 14a. Thereby, the discharge gas flowing into the water separation tank 14 from the inlet via the air discharging pipe 13 circulates along the inner wall, during which moisture contained therein is physically separated as droplets. The discharge gas thus dehydrated flows out of the exit of the tank 14 and is introduced into a regenerator (expansion device) 15 for the purpose of recovering the energy remaining therein. Note that the regenerator 15 is disposed coaxially with a motor 16 together with the compressor 11, wherein a water supply path 17 extending from the bottom wall of the water separation tank 14 is connected to a suction side of the compressor 11.

That is, while water stored in the water separation tank 14 is used on one hand as moisture for humidifying the process air necessary for a cation exchange membrane to maintain proton conductivity and on the other hand as moisture for cooling or lubricating the compressor 11, it is possible to convey the water stored in the water separation tank 14 to the compressor 11 by a back pressure without using separate energy source such as a pump or the like, which is caused by a pressure of the discharge gas being always applied to the interior of the water separation tank 14; i.e., to a surface of the water stored therein; via the air discharging pipe 13 during the operation of the system.

A controller 20 is provided, and various operational parameters, such as engine outputs of the vehicle and amounts of energy stored in the secondary battery, are input so that the rotational speed of the compressor 11 is controlled, for example, via a motor driving circuit 21, based on these input information. Simultaneously therewith, the output of the fuel cell 10 is also controlled.

The most characteristic constituent feature of the present invention is a solenoid valve 22 provided in the water supply path 17 in the vicinity of the water separation tank 14. The solenoid valve 22 is controlled by the controller 20 to be promptly closed by a command for stopping the output from the fuel cell 10 and opened again by a starting command and the compressor 11 is controlled to stop, after the solenoid valve 22 has been closed, based on an output signal from a sensor 23 for detecting a humidity of the process air discharged from the compressor 11.

Therefore, discharge gas from the fuel cell 10 is dehydrated in the water separation tank 14 and then introduced into the regenerator 15 wherein pressure energy remaining in the discharge gas is recovered after being converted into mechanical energy. On the other hand, the water separated and stored in the water-separation tank 14 is conveyed to the water supply path 17 as it is by the pressure of the discharge gas added to the stored water, and a suitable amount thereof is then conveyed to the suction side of the compressor 11 under the control of a flow control valve, not shown, for the purpose of cooling and lubricating the compressor 11.

That is, when the fuel cell 10 is operating, the rotational speed of the compressor 11 is optionally adjusted based on the above-mentioned various operational parameters. If a stop signal is input into the controller 20 when the output from the fuel cell 10 is to be stopped, the solenoid valve 22 is closed together with the fuel supply system to immediately block the water supply path 17. Even after the water supply path has been blocked in such a manner, the compressor 11 still continues the operation, whereby humidity of the process air discharged from the compressor 11 promptly decreases because of the interruption of the water supply and the humidity detected by the sensor 23 soon reaches a preset value. The preset value for the detected humidity is determined as a humidity at which the remaining moisture in the compressor 11, including the water supply path 17, has been removed as much as possible. Thus, if the humidity detected by the sensor 23 reaches the preset value, the sensor 23 issues a detection signal to the controller 20 which then issues a command for stopping the compressor 11 whereby the compressor 11 is made to stop via the motor driving circuit 21. In this case, a period of time from a first time at which the solenoid valve 22 is closed by the command for interrupting the output of the fuel cell 10 to a second time at which the compressor 11 is substantially stationary varies in accordance with the rotational speed of the compressor 11 at the first time. This is a proof in that the system always selects a minimum period for discharging the remaining moisture in accordance with the operational conditions at that time, whereby it is possible to avoid an accident caused by the freezing of the remaining water, without useless energy consumption.

In the above-mentioned embodiment, the humidity in the process air is detected by the sensor 23. Alternatively, it is also possible to detect a temperature of the process air by replacing the sensor 23 with a temperature detector determine whether or not moisture remains in the compressor 11. That is, when the humidity of the process air is decreased by the interruption of the water supply, the capacity for cooling the process air also lowers, whereby it is similarly possible to prevent an accident, caused by the freezing of the remaining moisture, from occurring, by detecting the temperature of the process air.

In a fuel cell system wherein water stored in the water-separation tank 14 is used as it is when the fuel cell 10 is restarted, it is necessary to provide suitable heat-insulation for the water-separation tank 14 to prevent the water therein from freezing. Or, if there is a separate water source for restarting the fuel cell, the water stored in the tank is discharged therefrom upon the stopping of the compressor 11 to avoid freezing of the stored water.

As described in detail above, according to the present invention, a command is issued for blocking the water feeding path prior to stopping the compressor after the output from the fuel cell is interrupted. After the water supply path has been blocked, humidity in the process air discharged from the compressor is detected. If the detected humidity decreases to the preset value, a command for stopping the compressor is issued. Therefore, since the compressor is made to stop at a time wherein water remaining in the compressor including the water supply path has substantially been removed, it is possible to assuredly prevent an accident, caused by the freezing of the remaining, water from occurring, without useless energy consumption, even if the system is used in a cold district. Also, according to the invention wherein the determination whether or not the water remains in the compressor is carried out by detecting a temperature of the process air, an accident caused by the freezing of the remaining water is similarly avoidable.

What is claimed is:

1. A method for preventing a compressor from freezing in an automobile fuel cell system which comprises a fuel cell having an air feeding tube and an air discharging tube, said compressor connected to the air feeding tube, a regenerator connected to the air discharging tube, a water separation tank disposed in the air discharging tube before the regenerator, and a water supply passage to supply water collected in the water separation tank to the compressor, said method comprising the steps of:

issuing a command to block the water supply passage when the output of the fuel cell is to be stopped while the compressor is operating;

detecting humidity in the process air discharged from the compressor after the water supply passage is blocked; and issuing a command to stop the compressor when the detected humidity decreases to a preset value.

2. A method for preventing a compressor from freezing in an automobile fuel cell system comprising a compressor connected to an air feeding pipe of a fuel cell, a regenerator connected to an air discharging pipe thereof, and a water-separation tank disposed midway of the air discharging pipe reaching the regenerator, so that water collected in the water-separation tank is supplied to the compressor via a water-feeding path, characterized in that the method comprises the steps of:

issuing a command, prior to stopping the compressor, to block the water-feeding path when the output of the fuel cell is interrupted, and after the water-feeding path is blocked, detecting a temperature of a process air discharged from the compressor to issue a command for stopping the compressor when the detected temperature increases to a preset value.

* * * * *